United States Patent [19]

Chen

[11] Patent Number: 4,971,402
[45] Date of Patent: Nov. 20, 1990

[54] VEHICLE BRAKE SYSTEM WITH LOCKING PREVENTIVE MECHANISM

[76] Inventor: Teh-Chih Chen, P.O. Box 67, Tounan, Taiwan, 63004

[21] Appl. No.: 406,920

[22] Filed: Sep. 12, 1989

[51] Int. Cl.$^5$ .................................................. B60T 8/34
[52] U.S. Cl. ...................................... 303/113; 303/68; 303/115
[58] Field of Search ............... 363/113, 84, 68, 69, 363/81, 83, 115

[56] References Cited

U.S. PATENT DOCUMENTS

| | | | |
|---|---|---|---|
| 3,608,984 | 9/1971 | Skoyles | 303/115 |
| 3,837,712 | 9/1974 | Grosseau | 303/68 |
| 4,768,841 | 9/1988 | Watanabe | 303/113 |

*Primary Examiner*—Matthew C. Graham

[57] ABSTRACT

A vehicle brake system includes: a brake master cylinder having a cylinder body and a master cylinder piston slidably received in the cylinder body, a plurality of wheel cylinders connected to the cylinder body of the master cylinder, an oil reservoir filled with brake hydraulic oil formed on a rear portion of the cylinder body and a pressure-reducing cylinder mounted on the brake master cylinder. Whenever braking a car provided with such a brake system, a brake pedal may be trodden to actuate the master cylinder piston to compress the brake hydraulic oil to brake the car wheels. However, an oil flow will be by-passed from an outlet pipe of the master cylinder to move a depressing piston restored in the pressure-reducing cylinder to by-pass an oil flow to return into the oil reservoir of the master cylinder for reducing the hydraulic oil pressure in the brake system for preventing a sudden locking a sudden locking of the car wheels in order for a safer emergency brake operation.

4 Claims, 2 Drawing Sheets

VEHICLE BRAKE SYSTEM WITH LOCKING PREVENTIVE MECHANISM

BACKGROUND OF THE INVENTION

In operating a conventional car brake system in case of emergency situation, a car driver may immediately tread the brake pedal at a great force, trying to stop the car right away. However, the output pressure of the brake hydraulic oil is very high, thereby suddenly locking the car wheels. Even the car wheels are locked, the great force of inertia of a car under high running speed may still cause slipping of the car or even turn over the car, possibly causing a serious traffic accident or injury especially on a rainy or snow day.

The present inventor has found such phenomena and invented the present vehicle brake system having means for preventing the locking of braked car wheels.

SUMMARY OF THE INVENTION

The object of the present invention is to provide a vehicle brake system including a pressure-reducing cylinder mounted on a brake master cylinder whereby upon an actuation of a master cylinder piston to compress the brake hydraulic oil to brake the car wheels, an oil flow by-passed from an outlet pipe of the master cylinder will move a depressing piston restored in the pressure-reducing cylinder to by-pass an oil flow to return into an oil reservoir of the master cylinder for reducing the hydraulic oil pressure for preventing the locking of the car wheels in an emergency brake operation.

DETAILED DESCRIPTION

Figure 1:
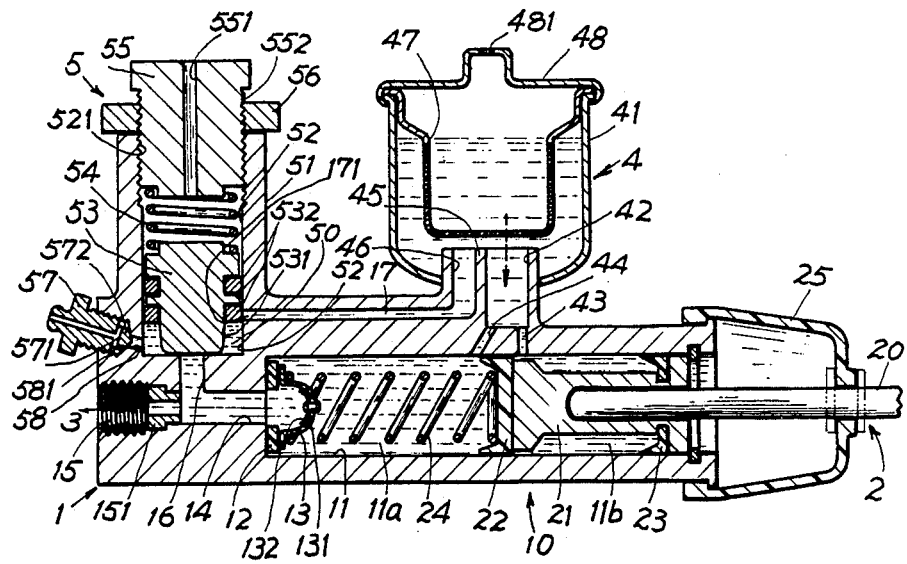
FIG. 1 is an illustration of the brake system of the present invention.

As shows in FIGS. 1-4, the present invention comprises: a brake master cylinder 10 having a cylinder body 1 and a master cylinder piston 2, at least a wheel cylinder 3 connected to the cylinder body 1 of the master cylinder 10, an oil reservoir 4 formed on a rear portion of the cylinder body 1, and a pressure-reducing cylinder 5 formed on a front portion of the cylinder body 1.

The cylinder body 1 includes: a horizontal bore portion 11 for slidably receiving the master cylinder piston 2 therein, a valve seat 12 formed on a front end of the bore portion 11 for holding a check valve 13 restored by a first restoring spring 24 retained between the valve seat 12 and a primary piston cup 22 formed on a front end of a piston head 21 of the master cylinder piston 2, a discharge port 14 formed on a front portion of the cylinder body 1 beyond the check valve 13 and a bore protion 11 which port 14 is connected with an outlet pipe 15 received at a pipe seat 151 secured to the port 14, a by-pass conduit 16 bifurcate from the discharge port 14 communicated with the pressure-reducing cylinder 5, and an oil return conduit 17 formed in the cylinder body 1 communicating the front pressure-reducing cylinder 5 and the rear oil reservoir 4. The check valve 13 includes a plurality of holes 131 operatively openable and normally sealable by a diaphragm 132 secured to the valve 13.

The master cylinder piston 2 includes: a push rod 20 having its front end secured with a piston head 21 and having its rear end secured to a brake link system (not shown) to be operated or trodden by a driver, a primary piston cup 22 secured on a front end of the piston head 21, a secondary piston cup 23 secured on a rear end of the piston head 21, a first restoring spring 24 retained between the primary cup 22 and the check valve 13, and a dust cover 25 encasing the push rod 20 and the piston 2 as shown in FIG. 1. The spring 24 normally urges the piston head 21 towards the right portion 11b of the bore portion 11.

The oil reservoir 4 includes: an oil container 41 having a neck portion 42 perpendicurlarly secured to an fluidically communicated with said cylinder body 1; an oil filling port 43 communicating the reservoir 4 and a rear bore portion 11b confined among the piston head 21, a circumferential surface of the bore portion 11 and the two cups 22, 23; an oil compensating port 44 communicating the reservoir 4 and a front bore portion 11a between the valve seat 12 and the primary piston cup 22; an oil return port 46 communicating the oil return conduit 17 and the reservoir 4 and separated from the compensating port 44 and filling port 43 by a central partition plate 45; an oil filter 47 secured on an upper edge of the container 41; and a top cover 48 having a venting hole 481 formed in the cover 48 covering the container 41. The oil may be drained into bore portion 11 through the ports 44, 43 as shown in an arrow dotted line in FIG. 1.

The pressure-reducing cylinder 5 includes: a cylinder portion 51 protruding from the cyclinder body 1 to be perpendicular to the body 1, a vertical bore portion 52 formed in the cylinder portion 51 communicated with the by-pass conduit 16 in the cylinder body 1 having a female-threaded portion 521 formed on an upper portion of the bore portion 52 through the cylinder portion 51, a depressing piston 53 reciprocatively held in a lower portion of the bore portion 52 resiliently urged by a second restoring spring 54, an adjusting plug 55 mounted on a top end portion of the cylinder portion 51, and an air-releasing plug 58 sealably secured on a side portion of the cylinder portion 51.

The depressing piston 53 has a lower cylindrical block 531 having a diameter smaller than an inside diameter of the bore portion 52 confining an annular aperture 50 between the block 531 and the bore portion 52, at least a piston ring 532 secured on a periphery of the piston 53 positioned above the lower cylindrical block 531 for slidably sealing the bore portion 52 of the cylinder 5 and normally sealing the return conduit 17 when the piston 53 is downwardly urged by the restoring spring 54.

The adjusting plug 55 includes a venting hole 551 for releasing air during the piston movements, a male-threaded portion 552 formed on a periphery of the plug 55 for adjustably engaging the female-threaded portion 521 of the cylinder portion 51 which plug 55 is fastened on the upper end of the cylinder portion 51 by a nut 56. The plug 55 is served for adjusting the tension of the spring 54. The specification or sizes of the elements of the present invention, such as: cylinder 5, piston 53, spring 54, etc., can be optionally modified depending upon practical requirements of different vehicles.

The air-releasing plug 57 includes an air-releasing hole 571 formed in the plug and leading outwardly through the plug for releasing air when filling the oil into the reservoir 4 and cylinder 10 and a plug portion 572 operatively sealing the plug seat 581 formed on an outer portion of an air releasing port 58 communicated with the bore portion 52 of the cylinder 5.

Figure 2:
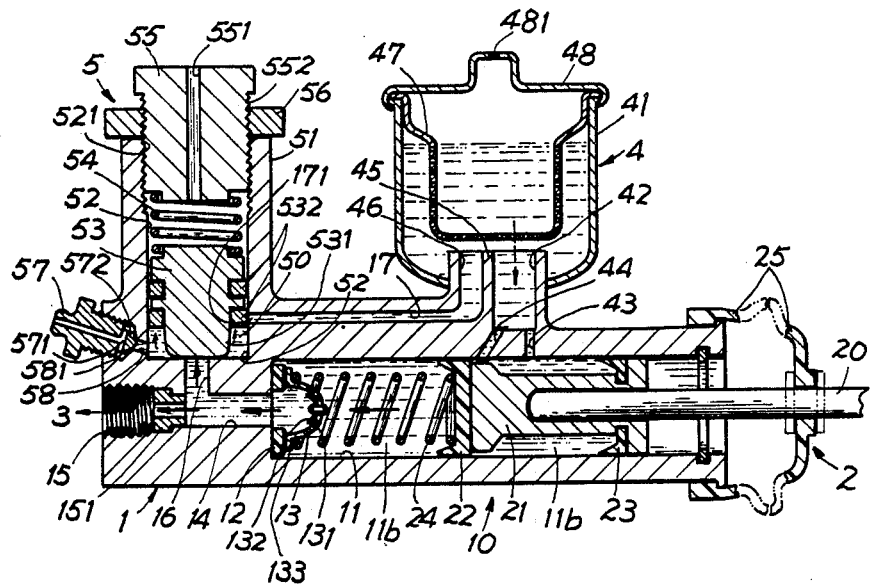
FIG. 2 shows a moderate slow down operation in accordance with the present invention.

In operating the present invention as shown in FIG. 2, when a car driver wants to stop his car such as when meeting a red light at a cross road he may lightly tread the brake pedal to drive the push rod 20 of the master cylinder 10 to boost the oil pressure (direction P1) towards the wheel cylinder or cylinders 3 (not shown) in order to slow down the car running speed, but not to lock the wheels due to an insufficient oil pressure. At this time, the insufficient oil pressure (direction P2) can not lift the piston 53 of the pressure-reducing cylinder 5 bearing against a spring force by the restoring spring 54.

Figure 3:
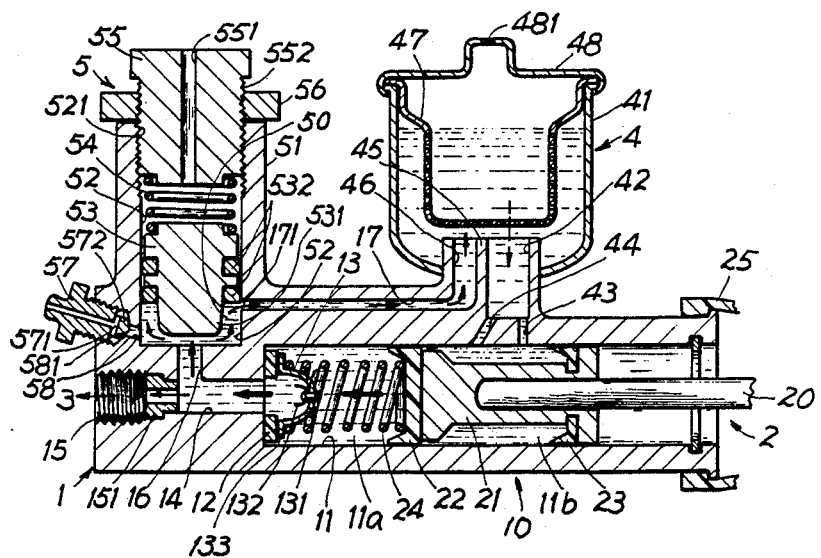
FIG. 3 shows an emergency braking operation of the present invention.

In case of an emergency situation and upon an instant braking operation of the present invention as trodden by a greater driver's force as shown on FIG. 3, the master cylinder piston 21 is pushed more frontwardly to increase the oil pressure (P) to temporarily lock the wheels through wheel cylinders 3 (direction P1). Meanwhile, the increased oil pressure will also move the depressing piston 53 upwardly to raise the lower piston ring 532 above an inlet port 171 to lead a by-pass oil flow through the conduit 16, aperture 50 and return conduit 17 (direction P2), thereby reducing the oil pressure in the brake system and slightly rotating the car wheels continuously.

Once the oil pressure in the outlet pipe 15 is instantly reduced, the piston 53 will be restored to downwardly seat on an outlet port of the by-pass conduit 16 by the restoring spring 54. A continuous braking operation by further pushing the piston 2 will boost the oil pressure in outlet pipe 15 to "lock" the wheels. The high oil pressure will repeatedly move the depressing piston 53 to by-pass the oil through conduit 17 into reservoir 4 for reducing the oil pressure for slightly running the car without being locked. By the repeated locking (braking) of wheels and the slightly forward running of wheels due to reduced oil pressure will smoothly slow down the car speed until a final stop, therefore preventing a suddenly braking, such as found in a conventional brake system, which may fastly slip to cause car collision or even turn over a car to cause serious traffic accidents.

Figure 4:
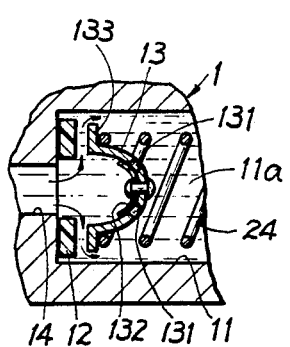
FIG. 4 shows a releasing of a brake system of the present invention.

After releasing a driver's treading of the brake system, the first restoring spring 24 will restore the master cylinder piston 2 and the valve 13 will be opened to seperate a valve flange 133 from the seat 12 from the situation as shown in FIG. 4 to a normal condition as shown in FIG. 1.

Figure 5:
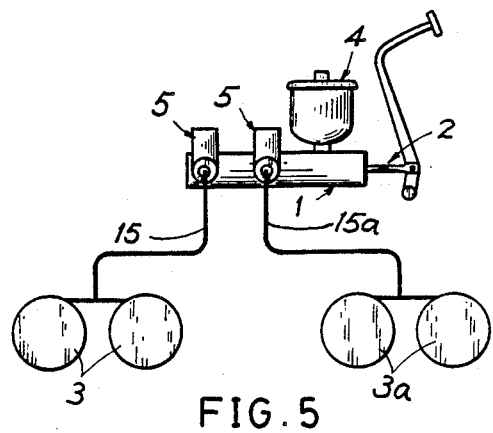
FIG. 5 is a flow sheet showing a dual circuit brake system of the present invention.

FIG. 5 shows an use of the present invention for a dual circuit brake system, in which two pressure-reducing cylinders 5 may be mounted on two outlet pipes 15, 15a respectively leading to a front wheel cylinder 3 and a rear wheel cylinder 3a.

Figure 6:
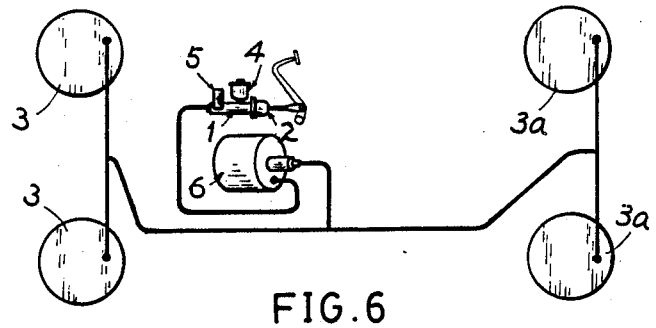
FIG. 6 shows an example of the present invention used in a vacuum hydraulic brake system.

The present invention may also be incorporated in a vacuum hydraulic system by mounting the pressure-reducing cylinder 5 between the master cylinder 1 and the vacuum hydraulic brake system 6 as shown in FIG. 6.

I claim:

1. A vehicle brake system comprising:
   a brake master cylinder including a cylinder body, a master cylinder piston slidably mounted in a first bore portion in said cylinder body, and an oil reservoir mounted on a rear portion of said cylinder body fluidically communicated with said first bore portion of said cylinder body; and
   a pressure-reducing cylinder mounted on a front portion of said cylinder body;
   the improvement which comprises:
   said pressure-reducing cylinder including a cylinder portion protruding from and perpendicular to said cylinder body and a depressing piston movably held in a second bore portion in said cylinder portion restored by a restoring spring held in said second bore portion, said depressing piston operatively sealing or opening an oil return conduit which is formed in said cylinder body communicating said pressure-reducing cylinder and said oil reservoir, said cylinder body having an oil by-pass conduit bifurcate from a discharge port connected between said first bore portion of said cylinder body and an outlet pipe connected to at least a brake wheel cylinder, whereby upon an emergency braking operation of the vehicle brake system by pushing said master cylinder piston to increase oil pressure in said outlet pipe for braking a vehicle wheels, an increased oil pressure will lift said depressing piston to bypass an oil flow through said oil by-pass conduit and said oil return conduit into said oil reservoir for reducing the oil pressure for preventing a sudden locking of vehicle wheels for safety purpose.

2. A vehicle brake system according to claim 1, wherein said depressing piston of said pressure-reducing cylinder includes a lower cylindrical block normally seating and sealing an outlet port of said by-pass conduit when said depressing piston is normally downwardly restored by said restoring spring, and at least a piston ring positioned above said lower cylindrical block normally sealing an inlet port of said oil return conduit and operatively opening said inlet port of said oil return conduit for by-passing an oil flow through said return conduit for reducing an oil pressure in the vehicle brake system, said lower cylindrical block and said second bore portion confining an annular aperture therebetween.

3. A vehicle brake system according to claim 1, wherein said pressure-reducing cylinder includes an adjusting plug adjustably mounted on an upper portion of said second bore portion in said cylinder portion for adjusting a tension of said restoring spring retained between said adjusting plug and said depressing piston, said adjusting plug having a venting hole for passing air therethrough during the movements of said depressing piston.

4. A vehicle brake system according to claim 1, wherein said pressure-reducing cylinder further includes an air-releasing plug having a plug portion operatively sealing an air releasing port formed in the cylinder portion communicated with said second bore portion, and an air-releasing hole formed in said air-releasing plug for releasing air therethrough during the filling of oil in the vehicle brake system.

* * * * *